United States Patent [19]
Burton

[11] Patent Number: 5,322,196
[45] Date of Patent: Jun. 21, 1994

[54] GREASE CONTAINER FOR REUSABLE COOKING OIL

[76] Inventor: Donna Burton, 1516 W. 102nd St., Los Angeles, Calif. 90047

[21] Appl. No.: 999,139

[22] Filed: Dec. 31, 1992

[51] Int. Cl.⁵ .............................................. B67D 1/16
[52] U.S. Cl. .................................. 222/109; 222/156; 222/498; 222/556; 210/244
[58] Field of Search .............. 222/108, 109, 111, 154, 222/156, 157, 158, 189, 465.1, 571, 498, 556; 210/244, 232, 238

[56] References Cited

U.S. PATENT DOCUMENTS

| | | | |
|---|---|---|---|
| 425,400 | 4/1890 | Boles | 222/556 |
| 943,512 | 12/1909 | Blanke | 222/189 X |
| 1,571,116 | 1/1926 | Green et al. | 222/108 |
| 1,641,051 | 8/1927 | Rheney | 222/189 |
| 2,083,632 | 6/1937 | Beck | 222/556 X |
| 2,216,407 | 10/1940 | Bradford | 222/556 |
| 2,281,135 | 4/1942 | Becker | 222/556 X |
| 2,450,520 | 10/1948 | Maddux | 210/244 |
| 3,716,169 | 2/1973 | Chivers | 222/157 |
| 4,040,964 | 8/1977 | Hegyi | 210/244 X |
| 4,555,339 | 11/1985 | Graves et al. | 210/244 |
| 5,015,112 | 5/1991 | Arnold | 401/202 |

FOREIGN PATENT DOCUMENTS

| | | | |
|---|---|---|---|
| 524585 | 3/1930 | Fed. Rep. of Germany | 222/109 |
| 4540 | 2/1912 | Netherlands | 222/108 |

*Primary Examiner*—Andres Kashnikow
*Assistant Examiner*—Kenneth DeRosa

[57] ABSTRACT

The significance of this invention is to provide an upgraded container for reusable cooking grease. The product comprises components constructed of heat resistance material to effectively store, refrigerate and reheat cooking oil without deforming shape or dimension. There is a flip latch used to scoop grease drippings back into the container and to cover the pouring holes. Beneath the holes is a drip catcher used to catch dripping grease after pouring. An indicator shows level of contents at all times. At the top rim of the container is the strainer secured in place to prevent anything other than grease from flowing back in the container.

2 Claims, 1 Drawing Sheet

GREASE CONTAINER FOR REUSABLE COOKING OIL

BACKGROUND OF THE INVENTION

1. Field of the Invention

This invention deals with the heating, refrigeration, and reusing of cooking grease.

2. Description of Prior Art

Excess cooking oil sometimes accumulates due to a variety of reasons. It is unsafe to store hot cooking grease into jars and can due to common household injuries. Moreover, this common method of storing is messy and unsightly.

Therefore, a container is desirable that may refrigerate, heat, and store cooking oil to avoid waste. After refrigeration, hardened grease can be discarded with proper disposal. The container can be washed and stored for further use.

Several types of products filter and collect grease for storage. U.S. Pat. No. 4,555,339 to Graves (1985) discloses an inner disposable container within an outer one that has two lids. However, both lids must be removed in order to store grease or remove it for cooking use. The inner container must be replaced after several uses, which become an expensive practice over time. This two piece container is expensive to produce and inefficient overall.

U.S. Pat. No. 4,040,964 to Heguyi (1977) discloses a strainer and handle which is adjustable to a container. However, one must obtain a container that will withstand hot cooking oil, and not deform the pot's shape when pouring. Yet the same configuration container must be able to refrigerate grease and store it at room temperature. Purchasing two separate items is costly, not to mention time consuming locating them for use.

U.S. Pat. No. 5,015,112 to Nancin (1991) discloses a container with an applicator to drain excess grease to and from the pot. Yet, it does not provide a strainer to avoid draining anything other than grease. This applicator must be assembled to the container before usage. This is an impossibility if misplaced or lost.

My invention describes a container feasible and capable of doing all of the above with repeated use without disposal. All other grease containers, heretofore, must concede one or more of the following disadvantages:

(a) angled spouts are set on top of the orifice and more likely to spill, as well as an inconvenience to remove for certain functions.

(b) containers without handles and pouring spouts are hazardous as it is difficult to grip or pour.

(c) container which incorporates assembly parts are time consuming.

(d) production of container with assembly or inner disposal parts are expensive to replace.

(e) most grease containers cannot indicate the grease level at any given time.

SUMMARY OF THE INVENTION

Accordingly, the significance of this invention is to provide an upgraded container for reusable cooking grease.

The device of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DESCRIPTION OF THE PREFERRED EMBODIMENT," one will understand how the features of this invention provide its advantages, which include safety and simplicity of use.

Several features of the present invention are:

(a) a specially designed container with functional parts for storing and reusing grease as needed.

(b) an inexpensive container.

(c) a container that incorporates pour holes and a flip latch.

(d) a container which has two ways of retrieving grease. Through its large orifice, a large amount of grease can be taken at any one time, or through its pouring holes if needed in a liquid form.

(e) a container which can refrigerate hot cooking grease.

(f) a container without assembled parts.

(g) a container with an adjustable handle for relocating and pouring purposes.

(h) a container with a measuring device to indicate the grease level at any time.

This product's features also provide a container which may be easily and conveniently used to store and heat cooking grease, without assembled parts. It is inexpensive to manufacture, may be used repeatedly, and has no disposable parts or assembly required. Moreover, other features will become apparent from the consideration of the following description and drawing.

DESCRIPTION OF THE DRAWING

The preferred embodiment of this invention, illustrating all its features, will now be discussed in detail. This embodiment depicts the novel and non-obvious method and device of this invention shown in the accompanying drawing, which is for illustrative purposes only. This drawing includes the following figures (Figs.), with like numerals indicating like parts.

REFERENCE NUMERALS IN DRAWINGS

| 1 | knob | 8 | drip catcher |
|---|---|---|---|
| 2 | top | 9 | indicator |
| 3 | strainer | 10 | holding slits |
| 4 | slits | 11 | handle |
| 5 | flip latch | 12 | screw |
| 6 | pour holes | 13 | container body |
| 7 | pivot connector | | |

DESCRIPTION OF THE PREFERRED EMBODIMENT

Figure 1:
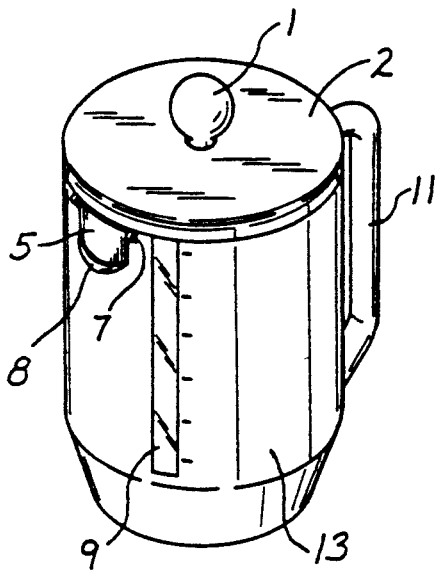
FIG. 1 shows a perspective view of the grease container.
Figure 2:
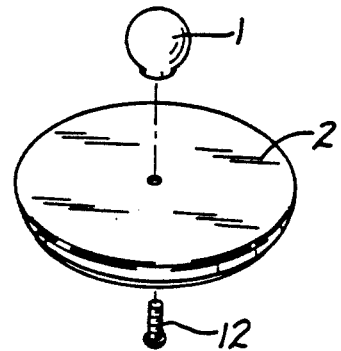
FIG. 2 shows an exploded view of the parts of the referred invention.

The preferred embodiment of this container of the present invention is illustrated in FIG. 1 (complete view) where all components of the grease container are shown assembled. FIG. 2 (exploded view) shows the container body 13 including a sidewall of a uniform cross section and a bottom end, made of a light weight, but strong, metal material which may be repeatedly heated without deforming its shape. The inside of the container body 13 is coated with Teflon covering to provide a slippery surface that makes it easy to wash off oil or sticky liquid after heated. However, the container body 13 and other parts may consist of any other material that can be repeatedly heated without deforming, such as metal, aluminum, copper, lead, and tin. Some examples for plastic material would be polypropylene, polystyrene, cellulose Acetate, used mostly for knob and handles.

Attached to one sidewall of the container body 13 is a handle 11 which is used for gripping and pouring contents from the container body 13. This handle 11 is connected at each end by screws 12 which are fastened directly through the container body 13 into the handle 11 to secure it in place. On the opposite sidewall of the container body 13 is an indicator 9, a clear plastic tab to show the level of content at any time, as shown in FIG. 2. Equally spaced around the open end of the container body 13 are four holding slits 10. They are 0.8 mm to 1.2 mm in width and 1.5 mm in depth. The dimensions can vary depending on overall size of the container body 13. They are used to house four slits 4 on a strainer 3. The strainer 3 is used to prevent anything other than grease from entering into the container body 13. It has a ring shape with thin wires forming a complete circular screen, which fits securely on the container body 13 into the holding slits 10 as shown in FIG. 2. A top 2 is used to cover the strainer 3 and has a knob 1 connected to it by means of a screw 12 through the center of the top 2 which hold the knob 1 in place to remove or restore the top 2. The body of the top 2 has a smaller rim which fits into the strainer 3 as shown in FIG. 1.

Figure 3:
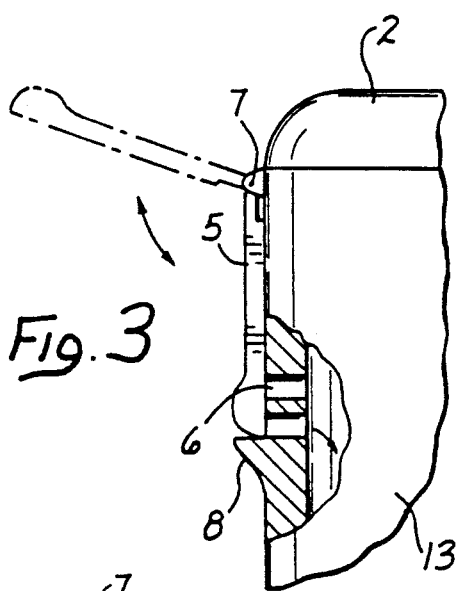
FIG. 3 shows a view of the flip latch 5.
Figure 4:
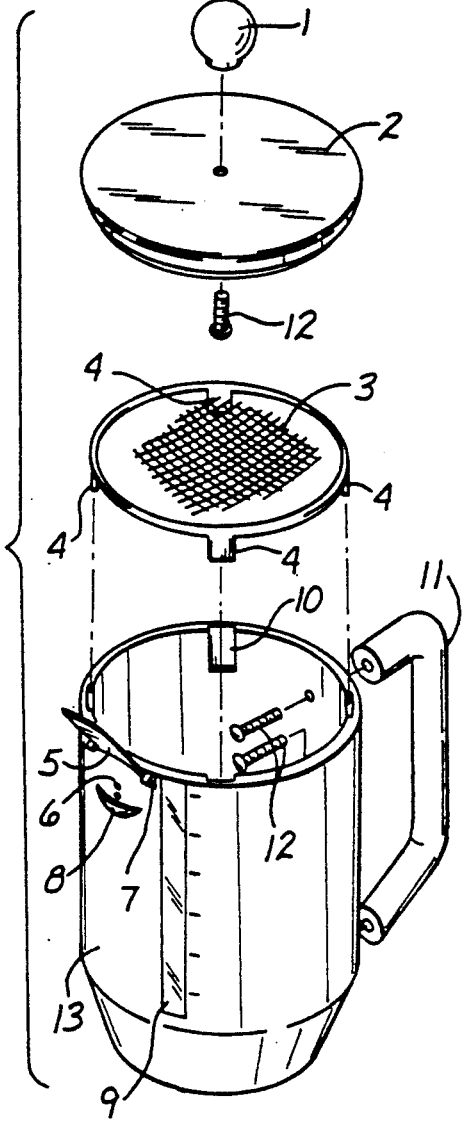
FIG. 4 shows a view of the pivot connector 7 and the flip latch 5 in the closed position.
Figure 4:
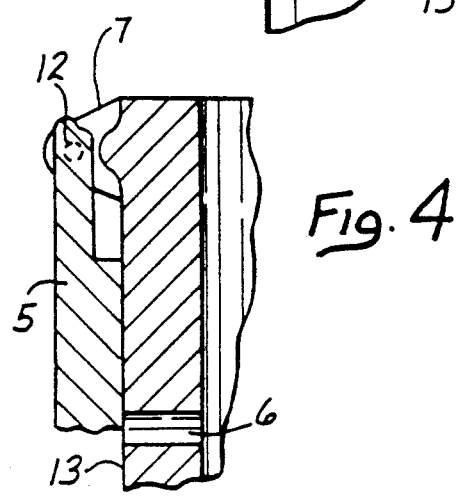
Figure 5:
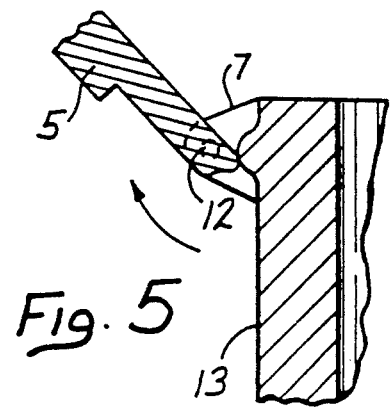
FIG. 5 shows a view of the pivot connector 7 and the flip latch 5 in the open position.

Additional features are a flip latch 5, pour holes 6, a pivot connector 7 and a drip catcher 8. As stated the grease can be melted down into liquid form and poured though the pour holes 6. There are four to six small orifices which are 0.5 mm wide and are located on the sidewall of the container body 13 opposite of the handle 11 in FIG. 2. Beneath the pour holes 6 is the drip catcher 8, a small protruding piece of metal. It has two features: to catch drippings after pouring liquid though the pour holes 6, and for the flip latch 5 to use as a resting position when closed. FIG. 4 and 5 show the operational parts of the pivot connector 7 and the flip latch 5. There is a small lump in the sidewall of the container body 13 to hold the flip latch 5 open when liquid oil is needed. A small amount of pressure is needed to lift up and press down the flip latch 5 to allow it to pass the lump in the sidewall of the container body 13, as shown in FIG. 5. The flip latch 5 also is used to scoop loose grease back into the container body 13 by its cup-like design as shown in FIG. 3. It is connected to the pivot connector 7 by a small screw 12 which will allow the flip latch 5 to be lifted up and down, as shown in FIGS. 4 and 5.

From the description above a number of advantages of my grease container become evident:

(a) With a few additions and changes this container will prevent less common household injuries, due to the mishandling of hot oil.

(b) Within this one container, one may restore, refrigerate, reheat and retrieve the oil.

(c) The use of this container, whereby all parts of the container body 13 are embodied in a single piece, is less expensive to produce, and replacement of disposable parts are less burdensome for consumers.

(d) The present container can indicate levels of grease at any given time.

(e) This container provides a more sightly and cleaner surrounding, unlike other containers where grease runs down the sidewalls profusely, without pouring holes or a spoon drip catcher.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

I claim:

1. A grease container for reusable cooking oil, comprising:
    a container body substantially the shape of a cylinder, having a closed end, an open end and a sidewall between the ends, said sidewall having an outer surface;
    the container body having one or more pour holes, in close proximity to each other, near the open end of the container body;
    a drip catcher substantially the shape of a fraction of a cup, having a substantially straight edge where the drip catcher was split, a curved edge around the remainder of the perimeter of the drip catcher, and having an inner concave surface;
    the straight edge of the drip catcher mounted to the sidewall outside surface just below the pour holes, and oriented so that the inner concave surface is towards the open end of the container;
    a flip latch having ak curved end with a curved edge roughly the shape of the inside concave surface of the drip catcher, and having a pivoting end opposite the curved end;
    a pivot connector for connecting the pivoting end of the flip latch to the outer surface of the sidewall above the pour holes, said pivot connector allowing the pivoting end to rotate so the curved end of the flip latch can move between the curved edge and the straight edge of the drip catcher;
    whereby, grease on the drip catcher inner concave surface is swept back through the pour holes to inside the container body.

2. The grease container of claim 1, wherein the outer surface of the sidewall of the container body includes a build up of material, such that when the pivoting end of the flip latch is forced to pivot past the build up of material, it is maintained in an open position.

* * * * *